Patented Dec. 10, 1929

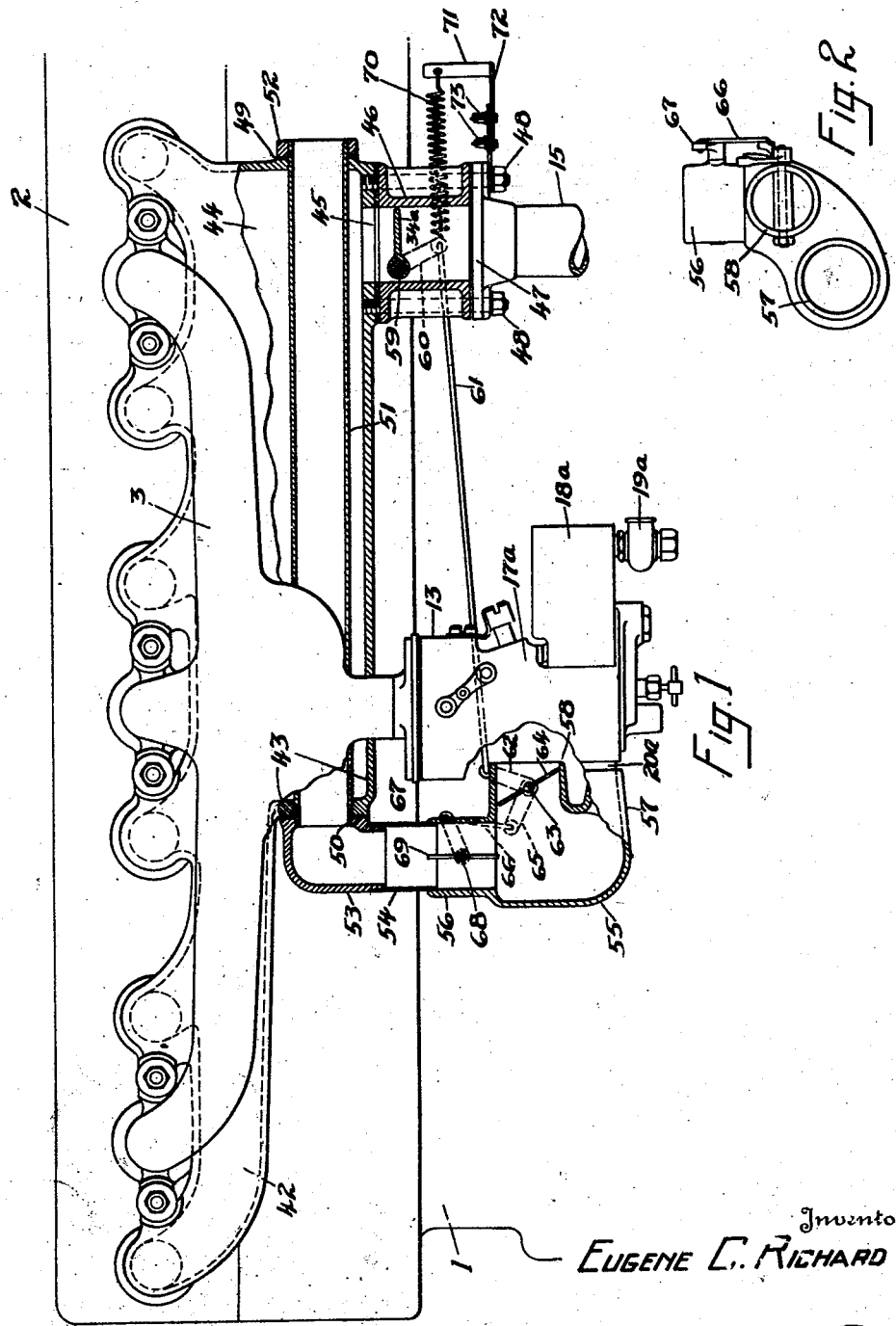

1,738,797

UNITED STATES PATENT OFFICE

EUGENE C. RICHARD, OF FLINT, MICHIGAN, ASSIGNOR TO GENERAL MOTORS CORPORATION, OF DETROIT, MICHIGAN, A CORPORATION OF DELAWARE

HEATING MECHANISM FOR INTERNAL-COMBUSTION ENGINES

Orginal application filed October 28, 1921, Serial No. 511,173. Divided and this application filed November 12, 1925. Serial No. 68,633.

This invention relates to internal combustion engines and more particularly to new and improved means for heating a part or all of the fluid for the intake, under certain conditions of operation of the engine, preparatory to its entry into the cylinders whereby the proper explosive mixture may be obtained for the motor under its various conditions of operation.

One of the objects of the invention is the provision of new and improved means for automatically operating the heating mechanism when motor operating conditions render it necessary or advantageous that a part of all of the intake fluid be heated in order to obtain the proper mixture and to prevent its condensation on the walls of the intake manifold.

Another object of the invention is the provision of means operated by the pressure of the motive fluid passing through the engine for automatically controlling the heating of the fuel, whereby the engine is readily warmed up on starting and the efficiency of the same increased under certain operating conditions thereof.

With these and other objects and advantages in view which will appear as the description proceeds, the invention consists in the novel construction and arrangement of parts, hereinafter described, particularly pointed out in the claims, and illustrated in the accompanying drawings, wherein, Fig. 1 is a side elevation of a portion of an engine showing my device applied thereto, parts being in section and parts broken away.

Fig. 2 is an end elevation of the hot air trap or chamber.

In the operation of an internal combustion engine, the explosive fluid consists of a mixture of air and finely divided particles of liquid fuel. The suction of the engine causes the air to enter through the intake passage and the air in being drawn through a restricted passage about the nozzle has its velocity increased to such an extent that it atomizes the fuel and carries the same along with it past the throttle into the intake manifold. In order to prevent the condensation of the fuel on the walls of the intake manifold while it is passing therethrough, it is necessary that either the mixture be in a heated condition or that its velocity be maintained above a certain minimum. Under certain operating conditions of the motor as when idling or operating at low speed on open throttle, the velocity of the mixture in the intake manifold falls below the minimum and hence condensation on the walls of the manifold results. In order to prevent such condensation, I have provided automatically operated means whereby the mixture will be at such a temperature while passing through the manifold that the condensation of the liquid fuel on the walls of the said manifold will not occur. In other words, the loss in velocity of the fluid is compensated for by increase in the temperature thereof. Mechanism controlled by the suction or operation of the engine, as by the pressure of the motive fluid, whether operated by the fluid before it passes through the engine or afterward, would, of course, afford proper means for automatically controlling the heating of the fuel to prevent its condensation and collection on the walls of the manifold. In the present invention the mechanism for accomplishing this purpose is controlled by the pressure or flow of the exhaust, and the heat is applied by heating the intake air.

In the form of the device as illustrated in the drawings the engine 1 having the head 2, intake manifold 3 and carburetor 17ª may be of any suitable construction. As shown, they are of the usual construction. The carburetor 17ª is provided with the usual float chamber 18ª, fuel intake 19ª and air intake passage or extension 20ª.

The exhaust manifold 42 is provided with a downwardly extending portion 43 forming an exhaust chamber 44 through which pass the exhaust gases from the engine. The chamber 44 at one end and on the lower side thereof is provided with an opening 45 about which is secured in any suitable manner a valve chamber 46. The lower end of the chamber 46 rests on a flange 47 of the exhaust pipe 15. The parts are so arranged that the exhaust gases pass from chamber 44 through the valve chamber 46 and into the exhaust pipe 15. The valve chamber 46 is held in position by any suitable means, as by being clamped between the flange 47 and the lower wall of the exhaust chamber 44 by means of bolts or studs 48 which pass through the flange 47 and the flanges on the chamber 46 and are secured in the bottom wall of the exhaust manifold 42.

The exhaust chamber 44 is provided at the ends thereof with openings 49 and 50, respectively, in which are fitted the ends of an air intake pipe or passage 51. The pipe or passage 51 may be secured in position by any suitable means such as the nut 52 threaded on its rear end and engaging the rear face of the wall about said opening 49, and an elbow 53 secured on its forward end and engaging the front face of the wall about said opening 50.

A sleeve 54 secured on the lower end of the elbow 53 is in communication with a hot air trap or chamber 55 as by engaging in the upper end of the hot air intake extension 56 thereon. The chamber 55 may be of any suitable form, the one shown being in the form of an elbow having the lateral extension 57 which is adapted to be attached to the air intake extension 20ª of the carburetor 17ª. The hot air trap or chamber 55 is also provided with a cool air intake extension 58 offset from the vertical plane of the extension 57.

Means are provided whereby the carburetor 17ª is supplied with heated or non-heated air depending on the operating conditions of the engine. When the operating conditions are such that the velocity of the intake mixture is not sufficient to prevent its condensation on the walls of the said intake, the intake air is automatically directed through the heating device by the valve 34ª which is operated by the pressure of the exhaust. Any suitable valve arrangement for simultaneously opening the heating passage and closing the cool air or non-heating air passage and vice versa, and operated by the valve 34ª in the exhaust, may be employed. In the form illustrated a separate valve for each passage is employed. The chamber 46 is provided with a valve 34ª secured to the oscillating shaft 59 extending through said chamber adjacent the front wall thereof. The shaft 59 is provided with a crank or operating arm 60 to which is connected the rear end of a link 61, the forward end of which is pivotally connected to a crank or arm 62 on the inner end of an oscillating shaft 63 extending through the cool air intake passage or extension 58, for operating the cool air valve 64. The outer end of the shaft 63 is also provided with a crank or arm 65 to which is pivoted the lower end of a link 66 the upper end of which is pivotally connected to the crank or arm 67 secured to the outer end of the oscillating shaft 68, extending through the hot air intake extension 56 for operating the valve 69.

An extensible spring 70 tends to maintain the valve 34ª in closed position. This spring has one end secured to the crank or arm 60 and has its other end secured to the L-shaped anchor member 71. The anchor member 71 may be secured to one of the bolts 48 and may if desired have its base portion 72 composed of two sections slidably connected to each other and secured by means of bolts 73 carried by one section of the base member and engaging in a slot carried by the other member to hold the sections in adjusted position to vary the tension of the spring 70.

In operation, the air will enter through the passage 51 and be heated more or less by the exhaust when the velocity of the intake mixture in the manifold falls below a predetermined minimum as when the engine is idling or when the engine is operating at low speeds under open throttle conditions. In other words, under these conditions the pressure of the exhaust will not be sufficient to open the valve 34ª very wide and consequently a greater portion of the intake air will be automatically directed through the heated passage 51.

It will be understood that the heated mixture will greatly hasten the warming up of the engine when it is started and it has been demonstrated by experiments that the efficiency of the engine per unit of fuel consumed will also be increased.

It is thought from the foregoing taken in connection with the accompanying drawings that the construction and operation of my device will be apparent to those skilled in the art; and that various changes in size, shape, and proportion and details of construction may be made without departing from the spirit and scope of the appended claims.

This application is a division of Serial No. 511,173, filed October 28, 1921, Heating mechanism for internal combustion engines.

I claim:

1. In combination with an internal combustion engine including a carburetor provided with an air intake for supplying air for forming a fuel mixture, of means controlled by the flow of exhaust gas from the engine for varying the temperature of the intake air anterior to the mixing of said air and fuel in said carburetor.

2. In combination with an engine provided with an intake passage and an exhaust passage, of an air passage extending through said exhaust passage, a carburetor including an air intake, a hot air trap connected to said air passage and said air intake, and provided with an air intake, a valve therein, a valve for preventing the flow of air through said air passage, a pressure operated valve in said exhaust passage, means connecting said valves whereby the same will be operated simultaneously by the pressure of the exhaust on said pressure operated valve, means tending to hold said last named valve in closed position against the pressure of the exhaust, and means for varying the effectiveness of said last named means.

3. In combination with an engine including an exhaust passage and a carburetor having an air intake, of a hot air trap connected to said intake, said trap provided with a cool air passage and a hot air passage, means controlled by the flow or pressure of the exhaust for directing the air for the fuel mixture through the hot air passage when the velocity of the fuel mixture falls below a predetermined minimum and for directing the air for the fuel mixture through the cool air passage when the velocity of said fuel mixture rises above a predetermined maximum.

4. In combination with an internal combustion engine having a carbureter, of means for supplying air to said carbureter comprising a cold air source and a hot air source, means for varying the proportions of the air supplied from said sources, and means actuated by the flow of exhaust gas from said engine for actuating said proportion-varying means.

5. The combination with an internal combustion engine having an exhaust passage and a carburetor, of a heater for the air supplied to the carburetor, a conduit for supplying heated air to the carburetor and a conduit for supplying unheated air to the carburetor, means for varying the relative proportions of air flowing through said conduits and means responsive to flow of exhaust through said exhaust passage arranged to control said proportion-varying means to increase the supply of unheated air and reduce the suppply of heated air as the flow of exhaust gas increases.

6. The combination with an internal combustion engine having a carburetor and means for supplying air to said carburetor of means for heating said air before its entry into the carburetor and means responsive to the quantity of flow of the motive fluid of said engine operative to reduce the temperature of said air as the quantity of fluid passing through the engine increases.

In testimony whereof I affix my signature
EUGENE C. RICHARD